United States Patent
Kim et al.

(10) Patent No.: US 10,834,752 B2
(45) Date of Patent: Nov. 10, 2020

(54) METHOD AND APPARATUS FOR REQUESTING SYSTEM INFORMATION

(71) Applicant: LG ELECTRONICS INC., Seoul (KR)

(72) Inventors: Sangwon Kim, Seoul (KR); Youngdae Lee, Seoul (KR); Jaewook Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/064,968

(22) PCT Filed: Jan. 31, 2018

(86) PCT No.: PCT/KR2018/001308
§ 371 (c)(1),
(2) Date: Jun. 21, 2018

(87) PCT Pub. No.: WO2018/143656
PCT Pub. Date: Aug. 9, 2018

(65) Prior Publication Data
US 2019/0349787 A1    Nov. 14, 2019

Related U.S. Application Data

(60) Provisional application No. 62/453,469, filed on Feb. 1, 2017.

(51) Int. Cl.
*H04L 12/801* (2013.01)
*H04L 5/14* (2006.01)
(Continued)

(52) U.S. Cl.
CPC ......... *H04W 74/004* (2013.01); *H04W 24/02* (2013.01); *H04W 48/10* (2013.01);
(Continued)

(58) Field of Classification Search
CPC . H04W 24/02; H04W 48/10; H04W 74/0833; H04W 24/04
See application file for complete search history.

(56) References Cited

U.S. PATENT DOCUMENTS

2009/0259910 A1* 10/2009 Lee ................... H04L 1/1887
714/748
2010/0177747 A1* 7/2010 Chun ................ H04W 72/0446
370/336
(Continued)

FOREIGN PATENT DOCUMENTS

JP      2010506434 A    2/2010
KR      101548748 B1    9/2015
(Continued)

OTHER PUBLICATIONS

Potevio, "Discussion of Other SI request", 3GPP TSG RAN WG2 NR Ad Hoc, Jan. 17-19, 2017, R2-1700249.
(Continued)

*Primary Examiner* — Faruk Hamza
*Assistant Examiner* — Abusayeed M Haque
(74) *Attorney, Agent, or Firm* — Dentons US LLP

(57) ABSTRACT

Provided are a method for a user equipment (UE) to request system information in a wireless communication system and a device supporting the same. The method may include: transmitting a random access preamble for requesting system information to a base station (BS); receiving, from the BS, a random access response including only a random access preamble identifier (RAPID) corresponding to the transmitted random access preamble; and considering that a random access procedure is completed.

9 Claims, 15 Drawing Sheets

(51) Int. Cl.
  *H04L 12/28* (2006.01)
  *H04L 29/06* (2006.01)
  *H04W 74/00* (2009.01)
  *H04W 48/14* (2009.01)
  *H04W 74/08* (2009.01)
  *H04W 24/02* (2009.01)
  *H04W 48/10* (2009.01)

(52) U.S. Cl.
  CPC ........ *H04W 48/14* (2013.01); *H04W 74/006* (2013.01); *H04W 74/0833* (2013.01)

(56) References Cited

U.S. PATENT DOCUMENTS

| | | |
|---|---|---|
| 2010/0202288 A1 | 8/2010 | Park et al. |
| 2011/0170503 A1 | 7/2011 | Chun et al. |
| 2011/0211522 A1* | 9/2011 | Chung ............... H04L 1/1887 370/315 |
| 2013/0155891 A1* | 6/2013 | Dinan ............... H04W 28/0236 370/252 |
| 2013/0242851 A1 | 9/2013 | Dinan |
| 2014/0016593 A1* | 1/2014 | Park ................... H04W 74/004 370/329 |
| 2015/0043505 A1 | 2/2015 | Kim et al. |
| 2015/0237624 A1* | 8/2015 | Tang ................... H04W 48/16 370/329 |
| 2015/0319638 A1 | 11/2015 | Rune |
| 2016/0080969 A1* | 3/2016 | Tseng ................ H04W 76/23 370/329 |
| 2016/0142936 A1* | 5/2016 | Bressanelli ........ H04W 28/04 370/242 |
| 2018/0145798 A1* | 5/2018 | Suzuki ............... H04L 43/0864 |
| 2018/0227958 A1* | 8/2018 | Xiong ................ H04L 5/0055 |
| 2019/0159110 A1 | 5/2019 | Takahashi et al. |

FOREIGN PATENT DOCUMENTS

| | | |
|---|---|---|
| RU | 2499364 C2 | 11/2013 |
| WO | 2014003339 A1 | 1/2014 |
| WO | 2016004994 A1 | 1/2016 |
| WO | 2016198909 A1 | 12/2016 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.1.0 (Dec. 30, 2016), pp. 1-98, XP051230317.

Office Action of Japanese Patent Office in Appl'n No. 2019-510601, dated Jan. 7, 2020.

3GPP TS 36.321 V13.4.0: "3rd Generation Partnership Project; Technical Specification Group Radio Access network; Evolved Universal Terrestrial Radio Access; Medium Access Control (MAC) protocol specification (Release 13)," Valbonne, France, Dec. 30, 2016, (93 Pages).

* cited by examiner

METHOD AND APPARATUS FOR REQUESTING SYSTEM INFORMATION

CROSS-REFERENCE TO RELATED APPLICATIONS

This application is the National Stage filing under 35 U.S.C. 371 of International Application No. PCT/KR2018/001308, filed on Jan. 31, 2018, which claims the benefit of U.S. Provisional Application No. 62/453,469 filed on Feb. 1, 2017, the contents of which are all hereby incorporated by reference herein in their entirety.

BACKGROUND OF THE INVENTION

Field of the Invention

The present invention relates to a wireless communication system and, more particularly, to a method in which a UE requests other system information and a device supporting the same.

Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

System information refers to essential information for communication between a terminal and a base station. In 3GPP LTE, the system information is divided into an MIB (Master Information Block) and an SIB (System Information Block). The MIB is the most essential information. The SIB is subdivided into SIB-x forms according to its importance or cycle. The MIB is transmitted through a PBCH (Physical Broadcast Channel) which is a physical channel The SIB is common control information and is transmitted through a PDCCH differently from the MIB.

SUMMARY OF THE INVENTION

The number of system information blocks is continuously increasing, and radio resources are required to broadcast a system information block. Thus, as the number of system information blocks increases, the quantity of radio resources required to broadcast a system information block also inevitably increases. To transmit continuously increasing system information to a user equipment (UE), it is necessary to propose a method for requesting system information that efficiently utilizes radio resources.

According to an embodiment, there is provided a method for a UE to request system information in a wireless communication system. The method may include: transmitting a random access preamble for requesting system information to a base station (BS); receiving, from the BS, a random access response including only a random access preamble identifier (RAPID) corresponding to the transmitted random access preamble; and considering that a random access procedure is completed.

According to another embodiment, there is provided a UE for requesting system information in a wireless communication system. The UE may include: a memory; a transceiver; and a processor to connect the memory with the transceiver, wherein the processor may: control the transceiver to transmit a random access preamble for requesting system information to a BS; controls the transceiver to receive, from the BS, a random access response including only a RAPID corresponding to the transmitted random access preamble; and considers that a random access procedure is completed.

A UE can efficiently request other system information.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A/5G. However, technical features of the present invention are not limited thereto.

Figure 1:
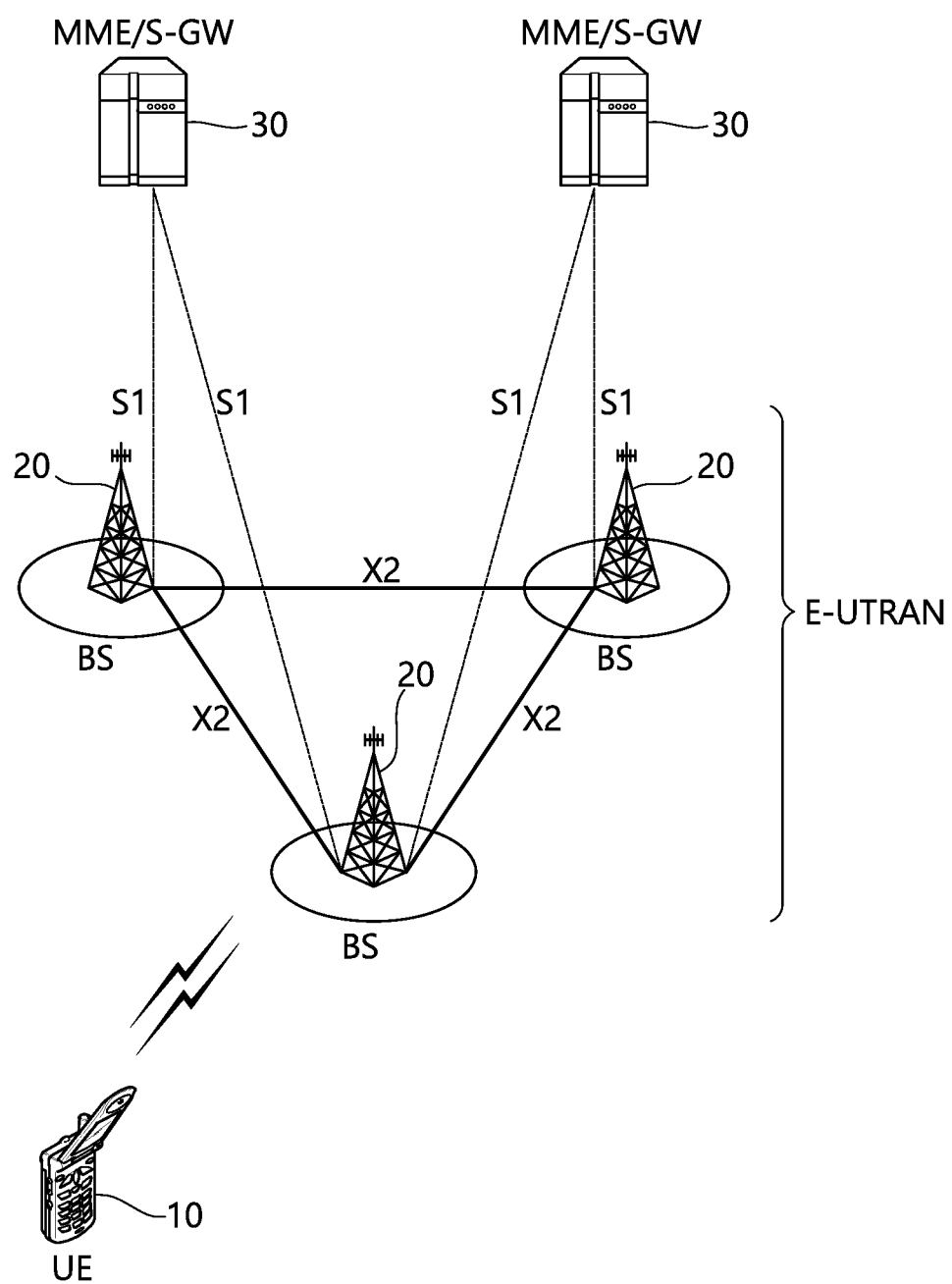
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
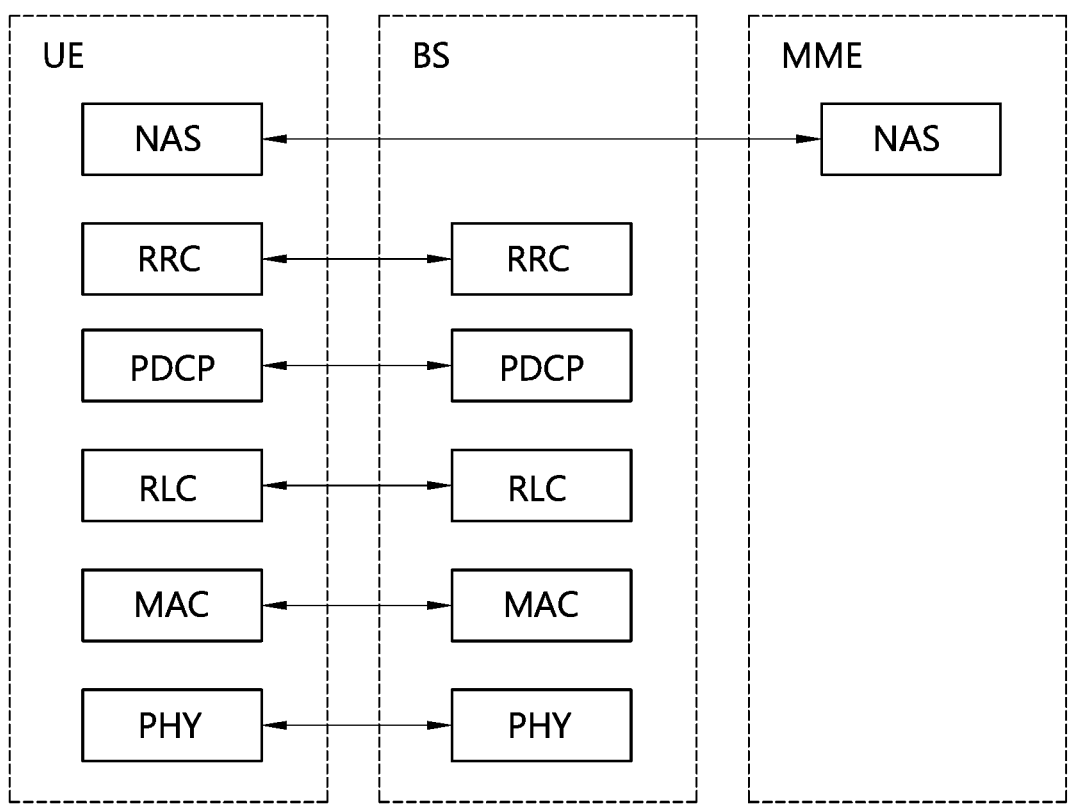
FIG. 2 shows a control plane of a radio interface protocol of an LTE system.
Figure 3:
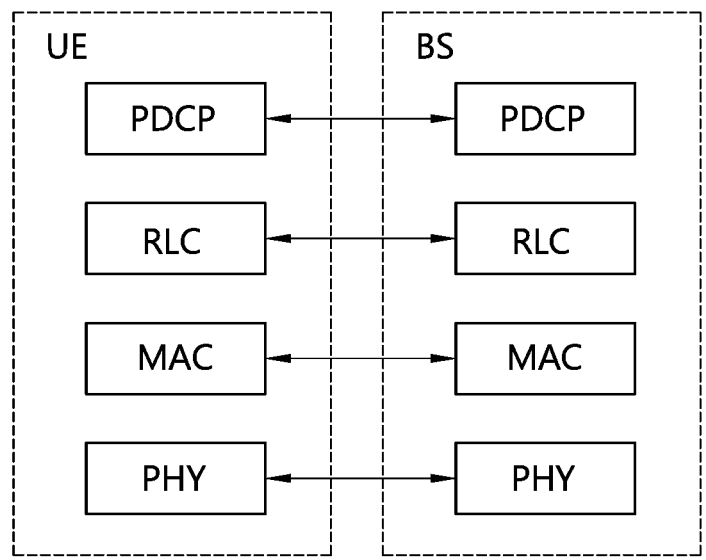
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having a RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, system information will be described.

Figure 4:
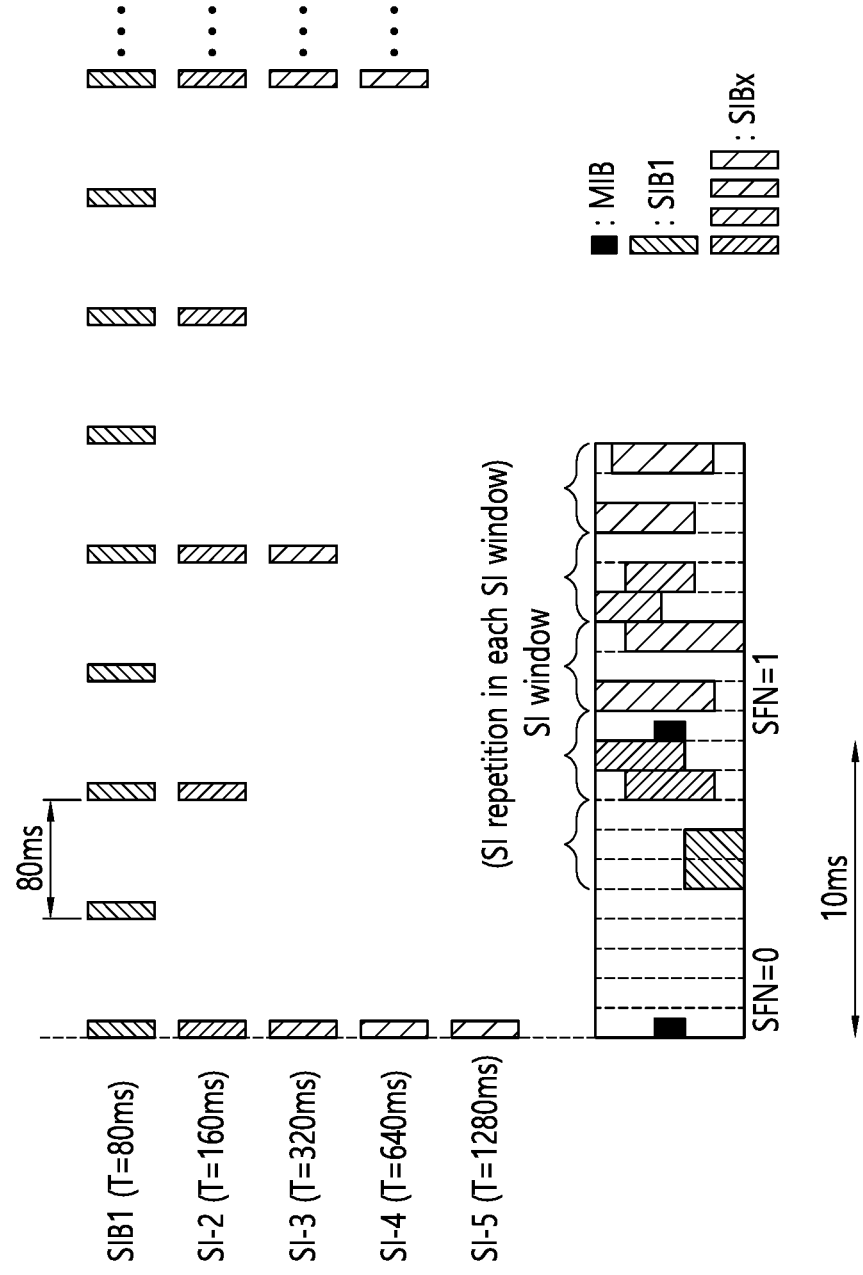
FIG. 4 shows an example of transmitting a master information block (MIB), system information block1 (SIB1), and other SIBs.

FIG. 4 shows an example of transmitting a master information block (MIB), system information block1 (SIB1), and other SIBs.

An LTE cell broadcasts basic parameters necessary for the operation of an IDLE_MODE UE and a CONNECTED_MODE UE via a plurality of separate information blocks. Examples of information blocks include an MIB, SIB1, SIB2, and other SIBs (SIBn).

The MIB includes the most essential parameters needed for a UE to access a cell. Referring to FIG. 4, an MIB message is broadcast through a BCH according to a periodicity of 40 ms, and MIB transmission is repeated in all radio frames within the periodicity of 40 ms. The UE receives an SIB message using the parameters received via the MIB.

There are different types of SIBs.

SIB1 includes pieces of information associated with cell access, and particularly includes scheduling information on other SIBs (SIB2 to SIBn) than SIB1. SIBs having the same transmission periodicity among the SIBs other than SIB1 are transferred via the same system information (SI) message. Thus, scheduling information includes a mapping relationship between each SIB and an SI message. An SI message is transmitted within an SI window in a time domain, and each SI message is associated with one SI window. Since SI windows for different pieces of SI do not overlap, only one SI message is transmitted within an SI window. Thus, scheduling information includes the duration of an SI window and an SI transmission periodicity. Time/frequency for transmitting an SI message is determined by dynamic scheduling by a BS. SIB1 is broadcast through a downlink shared channel (DL SCH) according to a periodicity of eight radio frames (that is, 80-ms periodicity), and SIB1 is repeatedly retransmitted on a fifth subframe of an SFN-mod-2 radio frame within the 80-ms periodicity.

SIB2 includes necessary information for a UE to access a cell. SIB2 includes information on an uplink cell bandwidth, a random access parameter, and an uplink power control parameter.

SIB3 includes cell reselection information. SIB4 includes frequency information on a serving cell and intra-frequency information on a neighboring cell for cell reselection. SIB5 includes frequency information on a different E-UTRA and inter-frequency information on a neighboring cell for cell reselection. SIB6 includes frequency information on a UTRA and information on a UTRA neighboring cell for cell reselection. SIB7 includes frequency information on a GERAN for cell reselection. SIB8 includes information on a neighboring cell.

SIB9 includes a Home eNodeB (HeNB) identifier (ID). SIB10 to SIB12 include a public warning message, for example, for earthquake warning. SIB14 is used to support enhanced access barring and controls UEs to access a cell. SIB15 includes information needed to receive an MBMS at contiguous carrier frequencies. SIB16 include GPS time and coordinated universal time (UTC)-related information. SIB17 includes RAN auxiliary information.

Not all SIB s are always required to be present. For example, SIB9 is not needed in a mode where a wireless carrier establishes an HeNB, while SIB13 is not needed if a cell provides no MBMS.

System information is commonly applied to all UEs accessing a cell, and UEs need to always maintain up-to-date system information to perform an appropriate operation. When system information is changed, UEs need to know in advance the time the BS transmits new system information. In order that a BS and a UE mutually recognize a radio frame period for transmitting new system information, the concept of BCCH modification period is introduced in "3GPP TS 36.331 v9.3.0," which is described in detail.

Figure 5:
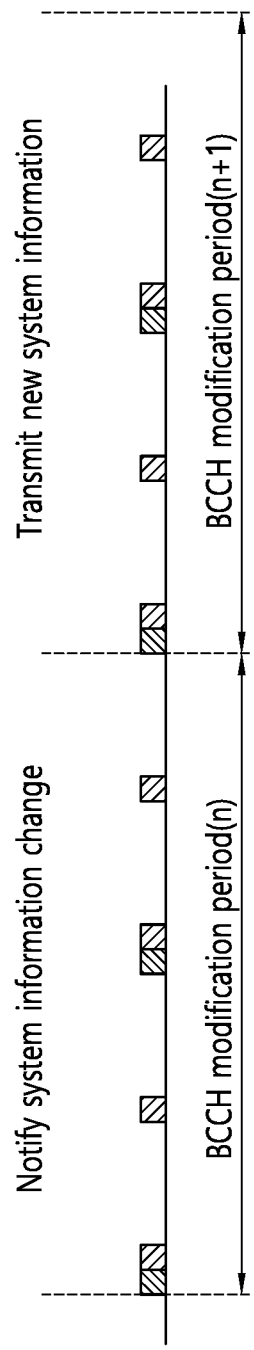
FIG. 5 shows an update of system information.

FIG. 5 shows an update of system information.

Referring to FIG. 5, a BS, which intends to update system information in an (n+1)th modification period, notifies in advance UEs of an update of system information in an nth modification period. A UE, which is notified the update of the system information in the nth modification period, receives and applies new system information at the very beginning of the (n+1)th modification period. When an update of system information is scheduled, the BS includes a system information modification indicator in a paging message. Generally, a paging message is a message received by an idle-mode UE. However, since an update of system information is notified through a paging message, a connected-mode UE also needs to receive a paging message at times and to identify an update of system information.

Hereinafter, random access will be described.

Random access is used by a UE to obtain uplink synchronization with a BS or to be allocated an uplink radio resource. After power is turned on, a UE obtains downlink synchronization with an initial cell and receives system information. Then, the UE acquires, from the system information, a set of available random access preambles and information about a radio resource used for transmission of a random access preamble. The radio resource used for transmission of the random access preamble may be specified as a radio frame and/or a combination of at least one or more subframes. The UE transmits a random access preamble randomly selected from the set of random access preambles, and the BS having received the random access preamble sends a timing alignment (TA) value for uplink synchronization to the UE through a random access response. Thus, the UE obtains uplink synchronization.

That is, the BS allocates a dedicated random access preamble to a specific UE, and the UE performs non-contention random access using the random access preamble. That is, there may be in a process of selecting a random access preamble, contention-based random access in which a UE randomly selects and uses one random access preamble from a particular set and non-contention random access in which only a specific UE is allocated a random access preamble by a BS. Non-contention random access may be used for a handover procedure or upon a request by a BS's command.

Figure 6:
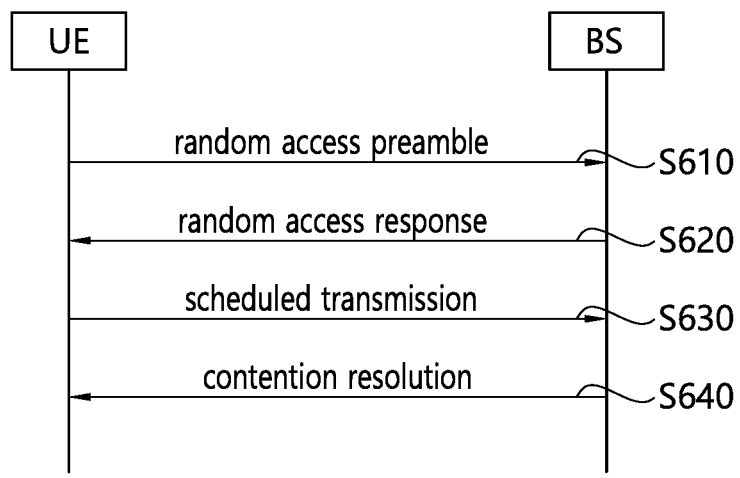
FIG. 6 illustrates a contention-based random access procedure.

FIG. 6 illustrates a contention-based random access procedure.

Referring to FIG. 6, a UE randomly selects one random access preamble from a random access preamble set indicated by system information or a handover command The UE selects a radio resource for transmitting the random access preamble to transmit the selected random access preamble (S610). The radio resource may be a specific subframe, and selecting the radio resource may be selecting a physical random access channel (PRACH).

After transmitting the random access preamble, the UE attempts to receive a random access response within a random access response reception window indicated by the system information or the handover command and accordingly receives a random access response (S620). The random access response may be transmitted in an MAC PDU format, and the MAC PDU may be forwarded via a physical downlink shared channel (PDSCH). Further, a physical downlink control channel (PDCCH) is also forwarded so that the UE properly receives information forwarded via the PDSCH. That is, the PDCCH includes information on the UE receiving the PDSCH, frequency and time information on a radio resource for the PDSCH, and a transmission format for the PDSCH. Once successfully receiving the PDCCH forwarded to the UE, the UE properly receives the random access response transmitted via the PDSCH on the basis of the information in the PDCCH.

The random access response may include a random access preamble identifier (ID), an uplink radio resource (UL grant), a temporary cell-radio network temporary identifier (C-RNTI), and a time alignment command (TAC). Since one random access response may include random access response information for one or more UEs, a random access preamble ID may be included to indicate a UE for which a UL grant, a temporary C-RNTI, and a TAC are valid. The random access preamble ID may be an ID of the random access preamble received by a BS. The TAC may be included as information for the UE to adjust uplink synchronization. The random access response may be indicated by a random access ID on the PDCCH, that is, a random access-radio network temporary identifier (RA-RNTI).

When the UE receives the random access response valid therefor, the UE processes information included in the random access response and performs scheduled transmission to the BS (S630). That is, the UE applies the TAC and stores the temporary C-RNTI. Further, the UE transmits data stored in a buffer of the UE or newly generated data to the BS using the UL grant. In this case, information to identify the UE needs to be included, which is for identifying the UE in order to avoid a collision since the BS does not determine which UEs perform random access in a contention-based random access process.

There are two methods for including information for identifying a UE. When the UE has a valid cell ID already allocated by a corresponding cell before performing random access, the UE transmits the cell ID thereof through the UL grant. However, when the UE is not allocated a valid cell ID before the random access process, the UE transmits a unique ID thereof (e.g, S-TMSI or random ID). Generally, the unique ID is longer than the cell ID. When the UE transmits the data via the UL grant, the UE starts a contention resolution timer.

After transmitting the data including the ID of the UE through the UL grant allocated by receiving the random access response, the UE waits for an instruction from the BS to avoid a collision (S640). That is, the UE attempts to receive the PDCCH in order to receive a specific message. There are two proposed methods for receiving a PDCCH. As described above, when the ID of the UE transmitted via the UL grant is a cell ID, the UE may attempt to receive the PDCCH using the cell ID of the UE. In this case, when the UE receives the PDCCH through the cell ID of the UE before the contention resolution timer expires, the UE determines that random access has been normally performed and terminates random access. When the ID transmitted via the UL grant is the unique ID, the UE may attempt to receive the PDCCH using the temporary C-RNTI included in the random access response. In this case, when the UE receives the PDCCH through the temporary cell ID before the contention resolution timer expires, the UE identifies data forwarded by the PDSCH indicated by the PDCCH. When the data includes the unique ID of the UE, the UE may determine that random access has been normally performed and may terminate random access.

Figure 7:
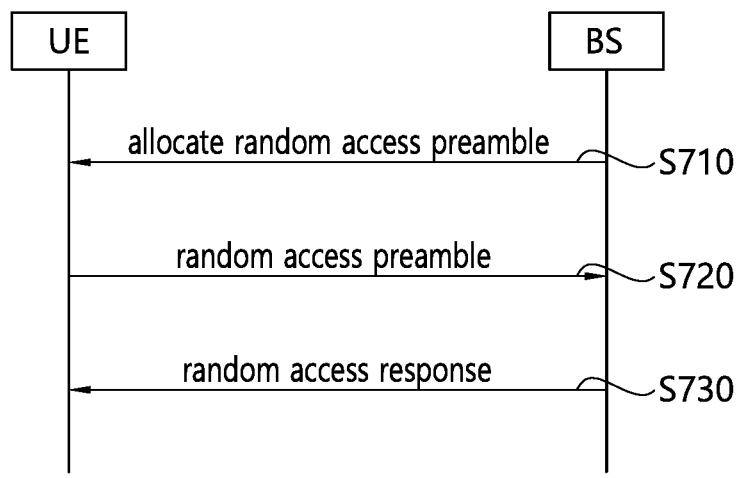
FIG. 7 illustrates a non-contention random access procedure.

FIG. 7 illustrates a non-contention random access procedure.

Unlike contention-based random access, non-contention random access may be terminated when a UE receives a random access response.

Non-contention random access may be initiated by a request, such as a handover and/or a command from a BS. Here, in these two cases, contention-based random access may also be performed.

The UE is allocated by the BS a designated random access preamble having no possibility of a collision. The random access preamble may be allocated through a handover command and a PDCCH command (S710).

After being allocated the random access preamble designated for the UE, the UE transmits the random access preamble to the BS (S720).

Upon receiving the random access preamble, the BS transmits a random access response to the UE in response (S730). A procedure associated with the random access response has been mentioned above in S620 of FIG. 6.

The number of system information blocks is continuously increasing, and radio resources are required to broadcast a system information block. Thus, as the number of system information blocks increases, the quantity of radio resources required to broadcast a system information block also inevitably increases. To solve such a problem, new-type system information is proposed.

Figure 8:
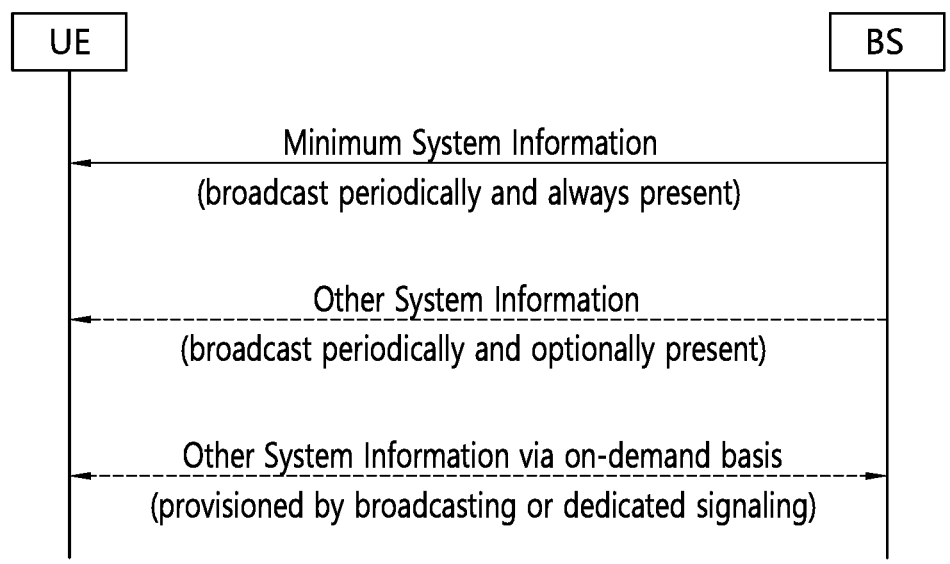
FIG. 8 shows a procedure for a UE to receive new-type system information.

FIG. 8 shows a procedure for a UE to receive new-type system information.

Referring to FIG. 8, the new-type system information may be divided into minimum system information and other system information. The minimum system information may be periodically broadcasted. The minimum system information may include basic information required for initial access to a cell and information for acquiring any other system information that is provisioned on an on-demand basis or is periodically broadcasted. The minimum system information may include at least one of a SFN, a list of PLMNs, a cell ID, a cell camping parameter, and a RACH parameter. When a network allows an on-demand mechanism, a parameter required to request the other system information may be included in the minimum system information. The other system information may refer to all system information not broadcast in the minimum system information.

Meanwhile, a UE may request a network to transmit system information in order to acquire other system information. For example, when the network does not broadcast specific system information, the UE in the RRC_IDLE mode may request the specific system information from the network using a RACH procedure. When the UE requests the specific system information from the network using a RACH procedure, a first message may be used to request system information, and the requested system information may be broadcast. When the first message is used to request the system information, the UE may not need to transmit a third message to the network. Furthermore, when the first message is used to request the system information, the UE does not need to transmit the third message to the network, and thus a UL grant for the third message does not need to be included in a second message. Hereinafter, a method for a UE to request system information in a random access procedure and a device supporting the system information will be described according to an embodiment of the present invention. In the present specification, a random access procedure for requesting system information may also be referred to as a system information request procedure. In the present specification, a message transmitted first in a random access procedure may be referred to as a first message or MSG1, a message transmitted second may be referred to as a second message or MSG2, a message transmitted third may be referred to as a third message or MSG3, and a message transmitted fourth may be referred to as a fourth message or MSG4.

Figure 9:
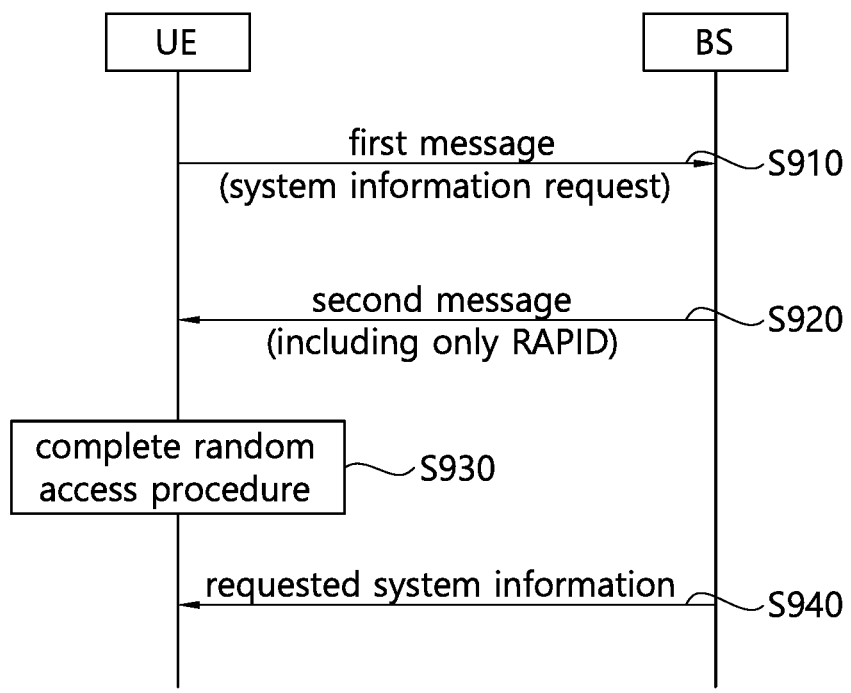
FIG. 9 shows a procedure in which a UE requests system information in a random access procedure according to an embodiment of the present invention.

FIG. 9 shows a procedure in which a UE requests system information in a random access procedure according to an embodiment of the present invention.

Referring to FIG. 9, in step S910, a UE may transmit a first message to a BS. The first message may be a random access preamble. The random access preamble may be used to request system information. The first message may be transmitted using a first message resource reserved to request system information. For example, when the UE desires to receive other system information, the UE may select a first message resource corresponding to other system information of interest and may transmit a first message requesting transmission of the system information using the selected first message resource. The UE may be in an RRC_IDLE state or an RRC_INACTIVE state.

In step S920, the UE may receive, from the BS, a second message including a random access preamble identifier (RAPID) corresponding to the transmitted random access preamble. That is, the UE may receive, from the BS, a second message including a first resource identifier that matches the transmitted first message resource. The second message may be a random access response or a system information request response.

The second message may include only the RAPID. When the random access preamble for requesting the system information is transmitted, the BS may transmit, to the UE, the second message including only the RAPID corresponding to the transmitted random access preamble. The second message may include only the RAPID corresponding to the random access preamble transmitted to request the system information in step S910 but may not include a medium access control random access response (MAC RAR). That is, the second message may not include a UL grant mapped to the random access preamble transmitted to request the system information in step S910. When the RAPID corresponds to any one of random access preambles set to request the system information, a MAC RAR may not be included in a MAC sub-PDU.

Figure 10:
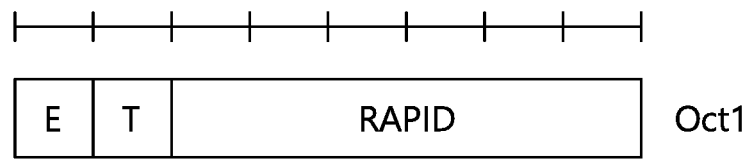
FIG. 10 shows an example of a MAC subheader including only a RAPID according to an embodiment of the present invention.

FIG. 10 shows an example of a MAC subheader including only a RAPID according to an embodiment of the present invention.

Referring back to FIG. 9, in step S930, when the UE receives the second message including only the RAPID (i.e., not including a MAC RAR or a UL grant), the UE may determine that the random access procedure for requesting the system information is completed. Accordingly, the UE may terminate the random access procedure for requesting the system information. Therefore, the UE may not transmit a third message to the BS. The UE may expect that the requested system information will be broadcast. In addition, the UE may report to a higher layer that an ACK of the request for the system information is received.

In step S940, the UE may verify when the requested system information will be broadcast and may receive the requested system information. The requested system information may be received in a broadcast manner.

Alternatively, although not shown in FIG. 9, in step S920, the UE may receive a second message including a MAC RAR corresponding to the transmitted random access preamble. Accordingly, upon receiving the second message including a UL grant, the UE may perform a four-step random access procedure and may enter the RRC_CONNECTED state. That is, the UE may transmit a third message to the BS, may receive a fourth message from the BS, and may enter the RRC_CONNECTED state. Then, the UE may receive the requested system information in a dedicated manner.

According to the embodiment of the present invention, when the UE transmits a random access preamble for requesting system information to the BS, the BS may transmit a random access response including only a RAPID corresponding to the transmitted random access preamble to the UE. Upon receiving the random access response, the UE may determine that a random access procedure for requesting the system information is completed. Accordingly, it is possible to prevent the waste of radio resources or battery consumption which may occur when the UE unnecessarily transmits a third message to the BS.

Figure 11:
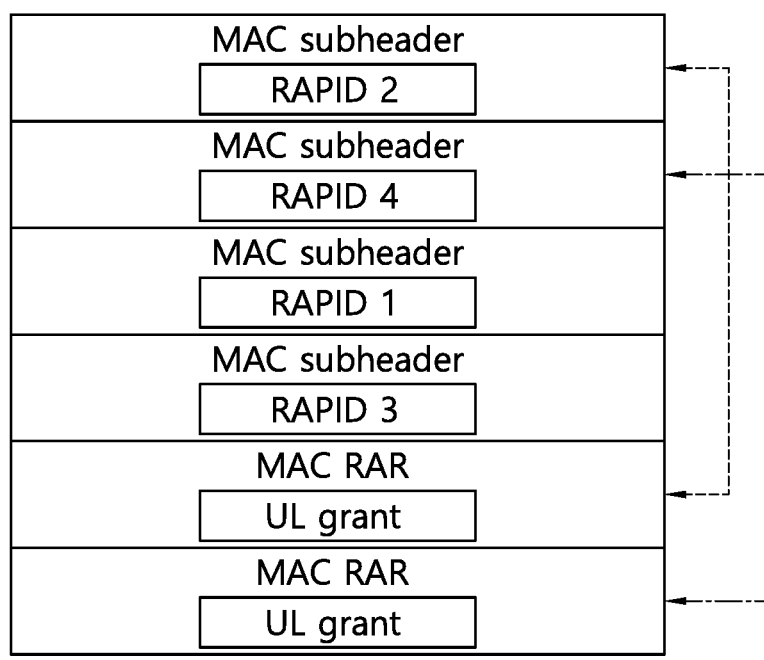
FIG. 11 shows an example of a MAC PUD according to an embodiment of the present invention.

FIG. 11 shows an example of a MAC PUD according to an embodiment of the present invention.

Referring to FIG. 11, the MAC PDU may include a MAC PDU header and zero or more MAC RARs. One MAC PDU header may include one or more MAC PDU subheaders. For each MAC PDU subheader including a RAPID, a corresponding MAC RAR may or may not be included in the MAC PDU. A first MAC subheader including a RAPID may be mapped to a first MAC RAR. A second MAC subheader including a RAPID may be mapped to a second MAC RAR. That is, the MAC subheader including RAPID 2 may be mapped to the first MAC RAR including a UL grant, and the MAC subheader including RAPID 4 may be mapped to the second MAC RAR including a UL grant. However, third and fourth MAC subheaders including a RAPID may not be mapped to any MAC RARs.

In the embodiment of FIG. 11, when a UE has used a first message resource having RAPID 2 or RAPID 4, the UE may perform a four-step random access procedure. That is, since the UE has received a random access response including a UL grant in response to a random access preamble, the UE may transmit a third message and may receive a fourth message after receiving a second message.

In the embodiment of FIG. 11, when the UE has used a first message resource having RAPID 1 or RAPID 3, the UE may determine that system information has been successfully requested. Thus, the UE may not transmit a third message to complete a random access procedure. Since the UE has received a random access response not including a UL grant in response to a random access preamble, the UE may complete the random access procedure without transmitting the third message.

In addition, in the embodiment of FIG. 11, a new indication including a RAPID may be included in a MAC subheader to indicate whether a MAC RAR is included in the MAC PDU.

Hereinafter, a method for a UE to request and receive system information on the basis of a new type of a RAR window in a random access procedure and a device supporting the same will be described according to an embodiment of the present invention. A network having received a first message may need to determine whether to broadcast or unicast system information requested by a UE and may require more time therefor. Thus, when the first message is used for requesting the system information, a conventional RAR may not be suitable. Therefore, it may be necessary to propose a new type of a RAR window. In the present specification, a first RAR window may be a RAR window used when a first message is transmitted for a general RACH purpose, and a second RAR window may be a RAR window used when the first message is transmitted for the purpose of requesting system information. When the first message is transmitted for the general RACH purpose, rather than for the purpose of requesting system information, a second message may be received within the first RAR window. However, when the first message is transmitted for the purpose of requesting system information, the second message may be received in the second RAR window. For example, when a UE transmits the first message using a resource reserved for requesting system information, the UE may apply a configuration for the second RAR window to receive the second message from the network. Otherwise, the UE may apply a configuration for the first RAR window to receive the second message from the network.

Figure 12:
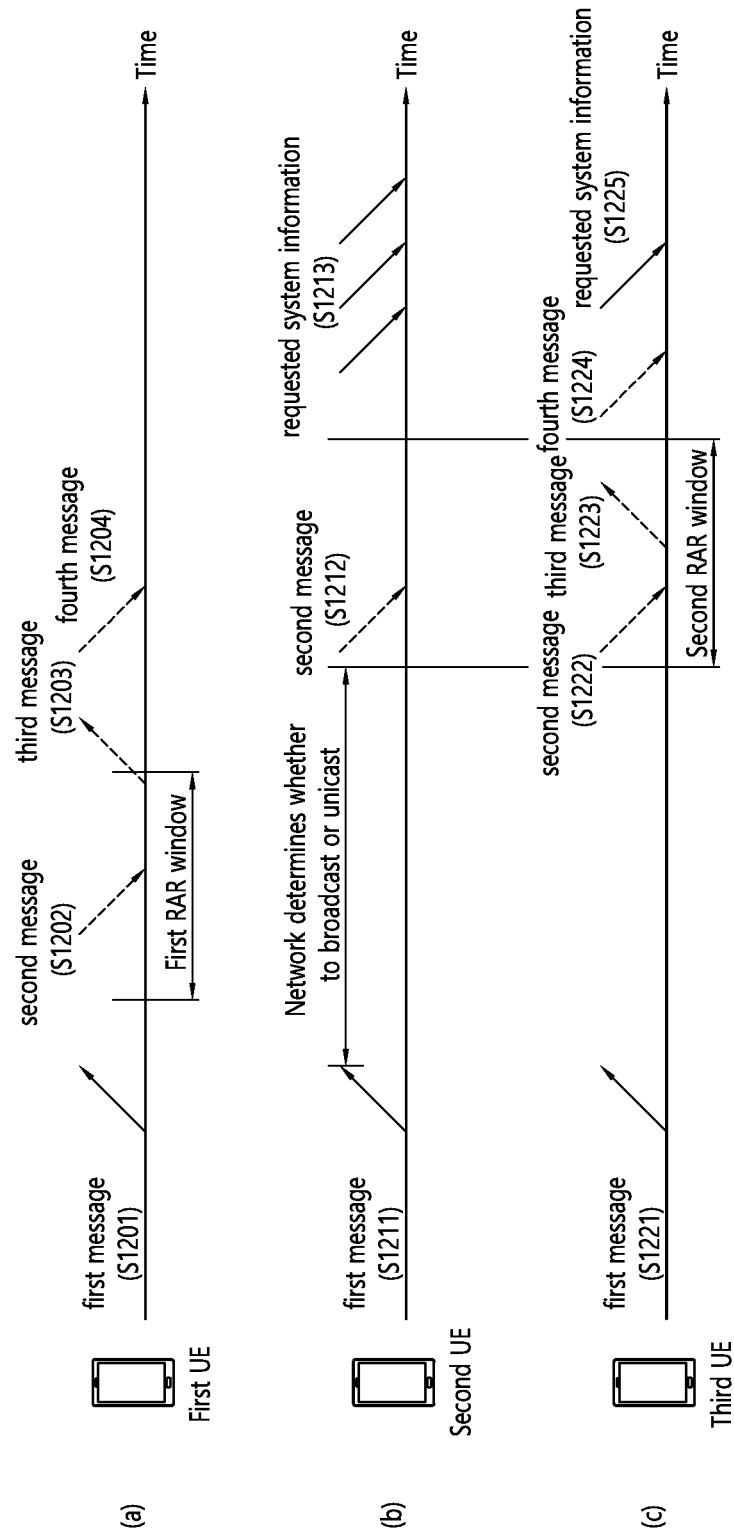
FIG. 12 shows a method for a UE to request and receive system information on the basis of a new type of a RAR window in a random access procedure according to an embodiment of the present invention.

FIG. 12 shows a method for a UE to request and receive system information on the basis of a new type of a RAR window in a random access procedure according to an embodiment of the present invention. Specifically, (a) of FIG. 12 shows an example in which a first message is transmitted for a general RACH purpose, and (b) and (c) of FIG. 12 show an example in which a first message is transmitted for the purpose of requesting system information.

Referring to (a) of FIG. 12, in step S1201, the UE may initiate a RACH procedure to establish a RRC connection. The UE may select a first message resource and may transmit a first message using the selected first message resource. The first message may be a random access preamble. The selected first message resource is not a resource associated with a request for system information. Thus, the UE may expect that a second message will be received within a first RAR window. The second message may be a random access response.

In step S1202, the UE may receive the second message in the first RAR window. The second message may be received according to a first RAR configuration. In step S1203, the UE may transmit a third message to a network. The third message may include a UE ID. In step S1204, the UE may receive a fourth message from the network. For example, the fourth message may be a RRC connection setup message. Then, the UE may enter the RRC_CONNECTED state.

Referring to (b) of FIG. 12, in step S1211, when a UE desires to receive other system information, the UE may select a first message resource corresponding to other system information of interest. The UE may transmit a first message requesting transmission of the system information using the selected first message resource. The first message may be a random access preamble. The selected first message resource is a resource associated with the request for the system information. Thus, the UE may expect that a second message will be received in a second RAR window. The second message may be a random access response or a system information request response.

Additionally, a network may determine whether to broadcast or unicast the requested system information. In (b) of FIG. 12, it is assumed that the network determines to broadcast the requested system information.

In step S1212, the UE may receive the second message including a RAPID corresponding to the transmitted random access preamble in the second RAR window. The second message may be received according to a second RAR configuration. The second RAR configuration may be periodically broadcast along with a first RAR configuration. When the second message including the RAPID corresponding to the transmitted random access preamble is received, the UE may determine that the system information has been successfully requested. Otherwise, the UE may consider that the request for the system information has failed and may retransmit the first message requesting the system information.

The second message may not include a UL grant or MAC RAR mapped to the transmitted random access preamble. When the UE receives the second message that does not include the UL grant or MAC RAR mapped to the transmitted random access preamble, the UE may consider that a RACH procedure for requesting the system information or a system information request procedure is completed. The UE may stop or complete the RACH procedure for requesting the system information or the system information request procedure. Additionally, the UE may expect that the requested system information will be broadcast.

In step S1213, the UE may check when the requested system information is broadcast. The UE may receive the requested system information in a broadcast manner Referring to (c) of FIG. 12, in step S1221, when a UE desires to receive other system information, the UE may select a first message resource corresponding to other system information of interest. The UE may transmit a first message requesting transmission of the system information using the selected first message resource. The first message may be a random access preamble. The selected first message resource is a resource associated with the request for the system information. Thus, the UE may expect that a second message will be received in a second RAR window. The second message may be a random access response or a system information request response.

Additionally, a network may determine whether to broadcast or unicast the requested system information. In (c) of FIG. 12, it is assumed that the network determines to unicast the requested system information.

In step S1222, the UE may receive the second message including a RAPID corresponding to the transmitted random access preamble in the second RAR window. The second message may be received according to a second RAR configuration. The second RAR configuration may be periodically broadcast along with a first RAR configuration. When the second message including the RAPID corresponding to the transmitted random access preamble is received, the UE may determine that the system information has been successfully requested. Otherwise, the UE may consider that the request for the system information has failed and may retransmit the first message requesting the system information.

The second message may include a UL grant or MAC RAR mapped to the transmitted random access preamble. When the UE receives the second message that includes the UL grant or MAC RAR mapped to the transmitted random access preamble, the UE may continue a RACH procedure for requesting the system information or a system information request procedure. The UE may expect that the requested system information will be unicast and may continue the four-step RACH procedure to receive the requested system information in a dedicated manner.

In step S1223, the UE may transmit a third message to the network. The third message may include a UE ID. In step S1224, the UE may receive a fourth message from the network. For example, the fourth message may be a RRC connection setup message. In step S1225, the UE may enter the RRC_CONNECTED state and may receive the requested system information through dedicated signaling.

Figure 13:
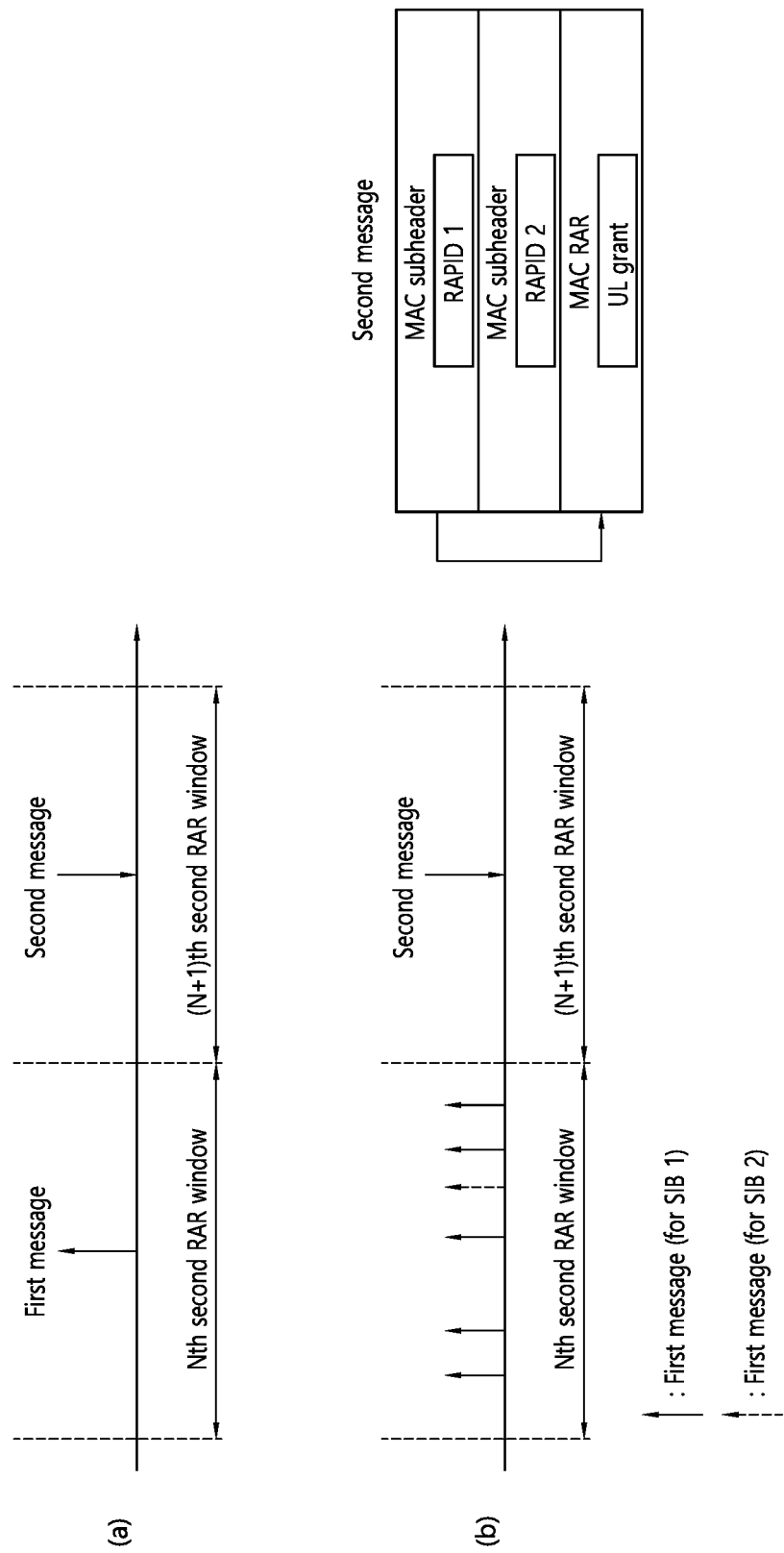
FIG. 13 shows an example in which requested system information is provided in a second RAR window according to an embodiment of the present invention.

FIG. 13 shows an example in which requested system information is provided in a second RAR window according to an embodiment of the present invention.

Referring to (a) of FIG. 13, when a UE transmits a first message in an Nth second RAR window, the UE may expect that a second message will be transmitted in an (N+1)th second RAR window. A configuration for the second RAR windows may be periodically broadcast.

Referring to (b) of FIG. 13, when a plurality of UEs requests a system information block in an Nth second RAR window, a network may determine to broadcast the requested system information block in an (N+1)th second RAR window. In this case, there may be no MAC RAR corresponding to a MAC subheader. However, one UE requests a system information block in the Nth second RAR window, the network may determine to broadcast the requested system information block in the (N+1)th second RAR window. Alternatively, the network may determine to unicast the requested system information block in the (N+1)th second RAR window. In this case, there may be a MAC RAR including a UL grant corresponding to a MAC subheader.

Figure 14:
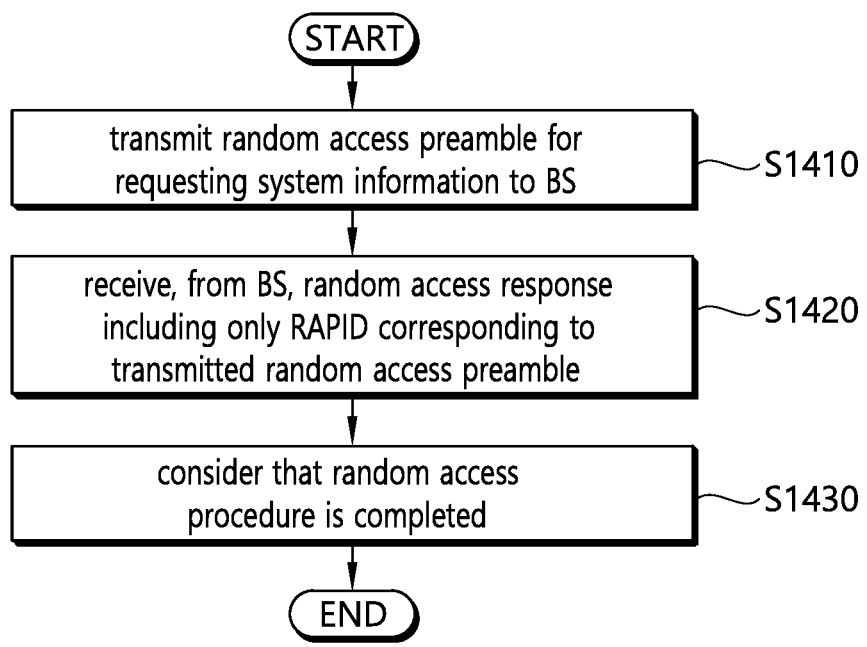
FIG. 14 is a block diagram illustrating a method for a UE to request system information according to an embodiment of the present invention.

FIG. 14 is a block diagram illustrating a method for a UE to request system information according to an embodiment of the present invention.

Referring to FIG. 14, in step S1410, the UE may transmit a random access preamble for requesting system information to a BS.

In step S1420, the UE may receive, from the BS, a random access response including only a RAPID corresponding to the transmitted random access preamble. The random access response may not include a MAC RAR corresponding to the RAPID. The random access response may not include a UL grant corresponding to the RAPID. The random access response including only the RAPID may be an ACK of the request for the system information. The random access response may be received from the BS using a MAC PDU.

The random access response may be received in a RAR window newly defined to receive the random access response corresponding to the random access preamble for requesting the system information.

In step S1430, the UE may consider that a random access procedure is completed. When the UE receives the random access response including only the RAPID, it is considered that the random access procedure is completed.

In the random access procedure, a third message may not be transmitted to the BS in response to the random access response.

In addition, the UE may transmit, to a higher layer, receipt of the ACK of the request for the system information.

In addition, the UE may check that the requested system information is broadcast. The UE may receive the requested system information.

Figure 15:
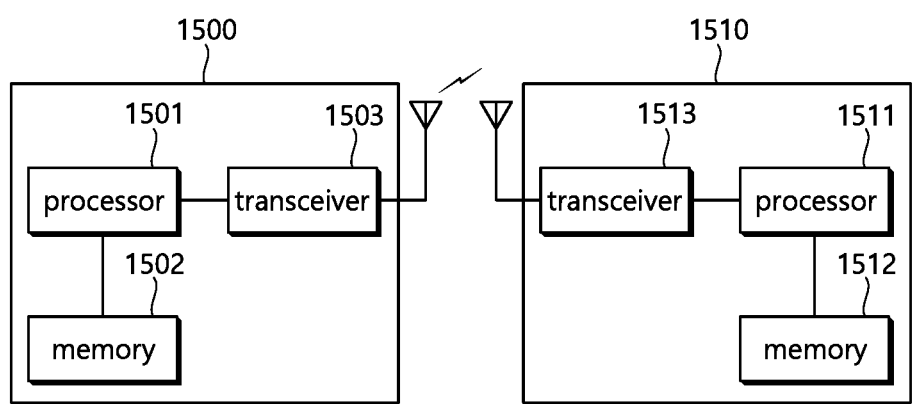
FIG. 15 is a block diagram illustrating a wireless communication system according to the embodiment of the present invention.

FIG. 15 is a block diagram illustrating a wireless communication system according to the embodiment of the present invention.

A BS 1500 includes a processor 1501, a memory 1502 and a transceiver 1503. The memory 1502 is connected to the processor 1501, and stores various information for driving the processor 1501. The transceiver 1503 is connected to the processor 1501, and transmits and/or receives radio signals. The processor 1501 implements proposed functions, processes and/or methods. In the above embodiment, an operation of the base station may be implemented by the processor 1501.

A UE 1510 includes a processor 1511, a memory 1512 and a transceiver 1513. The memory 1512 is connected to the processor 1511, and stores various information for driving the processor 1511. The transceiver 1513 is connected to the processor 1511, and transmits and/or receives radio signals. The processor 1511 implements proposed functions, processes and/or methods. In the above embodiment, an operation of the UE may be implemented by the processor 1511.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for requesting, by a user equipment (UE), system information in a wireless communication system, the method comprising:
   transmitting a random access preamble for requesting system information to a base station (BS);
   receiving, from the BS, a random access response (RAR) message including a random access preamble identifier (RAPID) related to the transmitted random access preamble,
   wherein the RAR message does not include a medium access control (MAC) RAR related to the RAPID;
   determining that a random access procedure is completed, based on the RAR message including no MAC RAR related to the RAPID; and
   receiving, from the BS, the system information without transmitting a message to the BS in response to the RAR message, based on the determination that the random access procedure is completed.

2. The method of claim 1, wherein the RAR message does not include an uplink grant related to the RAPID.

3. The method of claim 1, further comprising:
   transmitting, to a higher layer, receipt of an acknowledgement (ACK) of a request for the system information.

4. The method of claim 1, wherein the RAR message comprising only the RAPID is an ACK of a request for the system information.

5. The method of claim 1, wherein the RAR message is received from the BS using a MAC PDU.

6. The method of claim 1, wherein the RAR message is received in a RAR window newly defined to receive the RAR message related to the random access preamble for requesting the system information.

7. The method of claim 1, further comprising:
   checking that the requested system information is broadcast.

8. A user equipment (UE) for requesting system information in a wireless communication system, the UE comprising:
   a memory; a transceiver; and
   a processor, connected with the memory and the transceiver, that:
   controls the transceiver to transmit a random access preamble for requesting system information to a base station (BS);
   controls the transceiver to receive, from the BS, a random access response (RAR) message including a random access preamble identifier (RAPID) related to the transmitted random access preamble,
   wherein the RAR message does not include a medium access control (MAC) RAR related to the RAPID;
   determines that a random access procedure is completed, based on the RAR message including no MAC RAR related to the RAPID; and
   controls the transceiver to receive, from the BS, the system information without transmitting a message to the BS in response to the RAR message, based on the determination that the random access procedure is completed.

9. The UE of claim 8, wherein the RAR message does not include an uplink grant related to the RAPID.

* * * * *